United States Patent Office 3,220,993
Patented Nov. 30, 1965

3,220,993
HALOGENATED DEHYDROPOLYCYCLOPENTA-
DIENE AND ITS PREPARATION
Paul E. Blatz, Dallas, Tex., assignor to Socony Mobil
Oil Company, Inc., a corporation of New York
No Drawing. Filed Sept. 27, 1962, Ser. No. 226,720
18 Claims. (Cl. 260—93.1)

The present invention relates to novel halogenated derivatives of solid polymers of cyclopentadiene and their preparation and, more specifically, to certain solid halogenated-dehydropolycyclopentadienes that withstand exceptionally high temperatures and, hence, are useful as refractory polymers and, additionally, possess the desired property of unusually low conductance whereby they are useful as semi-conductors.

Still more specifically, the present invention relates to novel bromine-containing derivatives of solid polymers of cyclopentadiene and which bromine-containing derivatives contain bromine in an amount that does not exceed about 45% and which, expressed otherwise, contain up to about one bromine atom for two units of five-membered rings in the polymer. Such bromine-containing polymers may be further characterized in that they contain three double bonds for each two five-membered rings and in which polymer the unsaturation is mainly conjugated. Expressed still otherwise, and using bromine as an example, a bromine content of 38.3 weight percent is the theoretical value for a cyclopentadiene polymer in which every other unit of cyclopentadiene contains one bromine atom whereby the present invention relates particularly to solid polymers of cyclopentadiene containing a halogen in an amount up to about one atom of halogen per two units of the cyclopentadiene. In more specific embodiments, the invention relates to such polymers containing halogen in an amount of from about 1 to about 3 atoms of halogen per six units of cyclopentadiene. For example, in the case of the brominated derivatives, the novel products of this invention contain from about 15 to about 45% bromine. In preferred embodiment, the invention relates to halogenated solid polymers of cyclopentadiene in which the halogen content is substantially in the ratio of one atom of the halogen per two units of the cyclopentadiene as such polymers have been found to mold more readily and have lower resistivity properties than the polymers containing substantially less halogen than such a ratio.

In general, the novel halogen-containing solid polymers to which the present invention is directed are prepared from solid polymers of cyclopentadiene which have heretofore been disclosed and, hence, known to those skilled in the art. Suitable starting polycyclopentadienes for practice of this invention are solid polymers of cyclopentadiene prepared by polymerizing cyclopentadiene with use of a Ziegler-Natta type catalyst, typified by a combination of a titanium tetrahalide and an aluminum trialkyl, whereby there is produced a high molecular weight normally white solid polymer and which is distinguishable from polymers of cyclopentadiene produced by certain other methods, as by reaction of cyclopentadiene with trichloroacetic acid and which are generally of relatively low molecular weight.

In preferred embodiment, the solid polymers useful for halogenation as embodied herein are characterized by being substantially linear polymers of cyclopentadiene that have a molecular weight of at least about 1500 and, as is discussed hereinafter, undergo halogenation and dehydrohalogenation to produce halogen-containing polymers of exceptionally high thermal stability. As aforesaid, and although it is not intended to limit the present invention to such solid polymers prepared by specific methods used herein for illustrating the invention, a particularly suitable method for preparing the solid polymers for halogenation are known methods including the aforesaid known catalytic methods with cationic catalysts such as tin chlorides, titanium chlorides, combinations of titanium chlorides and aluminum alkyls, other Group IVb metal halides, etc. However, it is within the scope of this invention to utilize polymers of cyclopentadiene, prepared by other methods, as long as the solid polymer thus prepared is characterized by being of such molecular weight that it is solid, is a substantially linear polymer, and as discovered by applicant, undergo halogenation-dehydrohalogenation to produce the novel halogenated polymers embodied herein.

In accordance with this invention, the solid polymers of cyclopentadiene are subjected to halogenation by contacting a solution of the polymer with an appropriate halogen, suitable examples of which include bromine and chlorine, until there is produced a halogenated derivative having a halogen content that does not substantially exceed one atom of halogen per two units of five-membered rings and, more specifically, from about 1 and about 3 atoms of halogen per six units of five-membered rings in the polymer.

The halogenation can be carried out, with or without use of an organic base (e.g., pyridine), to aid in elimination of liberated hydrogen halide. The solution of the starting polycyclopentadiene can be contacted, under a substantially inert atmosphere, with a halogen to initially produce a halogenated polycyclopentadiene which is maintained at an elevated temperature for a period of time sufficient to dehydrohalogenate to a solid polymer containing from about one to three atoms of halogen per six units of five-membered rings in the polymer. Preferably, the polymer solution is contacted with an amount of halogen at least stoichiometrically sufficient to initially produce a saturated homopolycyclopentadiene. In such a reaction, carried out in accordance with this reaction and using bromine for purposes of illustration, the bromine color quickly disappears because of initial addition of the bromine to the double bonds of the cyclopentadiene polymer, followed by a change of the polymer solution through a series of colors with evolution of hydrogen halides until a final dark-colored product is produced. In further illustration, the bromine color quickly disappears because of addition to the double bonds followed by passage through a series of color changes from yellow to yellow-green to green to a final blue-black brominated polymer that contains substantially about one atom of bromine per two units of five-membered rings in the polymer. A polymer of lesser concentration of bromine can be obtained, if desired, by heating the dry brominated polymer in an inert atmosphere whereby additional bromine is removed as HBr is evolved and, for example, reduces the bromine concentration to less than one atom per two units of the cyclopentadiene in the polymer.

Thus, and although for illustrating the invention use is made of specific embodiments set forth hereafter, such as specified amounts of halogen, reaction time, temperature, solvents, etc., it should be understood that the method aspects of this invention are not limited thereto. Insofar as the process is concerned, it is of generic concept to the extent of reacting a solution of an appropriate solid cyclopentadiene polymer with a halogen for a period of time sufficient for the halogenated polymer that is produced to dehydrohalogenate to a cyclopentadiene polymer characterized by containing the aforesaid ratio of halogen per two units of five-membered rings in the polymer.

In further reference to the halogenation reaction embodied herein, it is carried out by having the polymerized cyclopentadiene dissolved in a liquid that is a solvent for the polymer. Examples of such solvents include organic substances such as chlorinated hydrocarbons (e.g., carbon tetrachloride), chlorinated aromatic such as chlorobenzenes, hydrocarbons such as cyclohexane, chlorinated aliphatics such as trichloroethylene, tetrachloroethylene, and others. More preferably, the solvent employed for such a purpose, in addition to being a solvent for the starting polymerized polycyclopentadiene, is substantially inert to halogenation.

Generally, the halogenation-dehydrohalogenation reaction is carried out at a temperature above room temperature (i.e., about 20° C.) and, for example, at a temperature above 30° C. and more preferably, higher than about 40° C. Although the reaction can be carried out at substantially high temperatures, and for example, up to about 250° C., preferred practice is to carry out the halogenation-dehydrohalogenation reaction at a temperature in excess of about 40° C. up to about 100° C. as the desired reactions appear to proceed in more controlled manner in such a temperature range. The halogenation-dehydrohalogenation reactions are expedited at the higher temperature, but, generally, the reaction is carried out for a period of half an hour or more in the presence of a base (e.g., pyridine) and, generally, for a longer period in the absence of a base. In general aspect, however, the invention embodies allowing the reaction to proceed until a halogenated polymer having the desired halogen content as embodied herein is obtained.

As aforesaid, the halogenation reaction is carried out under a substantially inert atmosphere (e.g., nitrogen, argon). The presence of oxygen is highly undesirable, as it tends to oxidize the polymer, and its presence in substantial amounts undesirably changes the physical and chemical properties of the halogenated polymer product.

In order to further describe the invention, the following examples are set forth for purposes of illustration and not limitation.

EXAMPLE 1

Polymerization of cyclopentadiene

Into a dried reactor maintained under a nitrogen atmosphere there were sequentially added 200 ml. of a liquid reaction medium (as shown in the following tabulation), and either (1) 2.2 ml. of TiCl$_4$ in cyclohexane (0.90 millimole/ml.), or (2) 2.3 ml. of a triisobutylaluminum in n-heptane (concentration of 0.840 millimoles of triisobutylaluminum per ml.) and 2.2 ml. of a TiCl$_4$ solution in cyclohexane (concentration of 0.90 millimole of TiCl$_4$ per ml.), or (3) SnCl$_4$. The reactor was brought to reaction temperature and 10 ml. of dry cyclopentadiene was added. Reaction was allowed to proceed for a defined period of time (as shown in the following tabulation), and the resulting polymer was isolated by adding the reactor contents to 2 liters of methanol maintained under vigorous stirring and bubbled with a stream of dry nitrogen. The polymer, obtained as a white precipitate, was filtered with suction and dried in vacuum under a nitrogen atmosphere at 55° C. for four hours.

Bromination of the polymer

Apparatus: Three-neck flask equipped with an addition funnel, gas inlet tube, reflux condenser, magnetic stirrer, and heater.

One hundred milliliters of carbon tetrachloride were added to the flask and stirred while a slow stream of nitrogen was started and flowed through the flask throughout the entire reaction period. Six grams of the polymer were then added which dissolved rapidly in the CCl$_4$. Bromine (14.52 g.) in 50 ml. of CCl$_4$ was then added rapidly to the reaction mixture via the addition funnel. Bromine addition occurred immediately and polymer began to precipitate with evolution of large quantities of HBr. After one-half hour, 15.8 grams of pyridine were added rapidly via the addition funnel, heat was applied, and the mixture allowed to reflux overnight. After a 24-hour reaction period, the product which separated from the reaction mixture was isolated by filtration and purified by slurrying with CCl$_4$ and methanol. After each slurry, the product polymer was filtered and finally dried in vacuum overnight at 55° C.

| Run No. | Preparation of Polycyclopentadiene | | | | | Brominated Derivatives | |
|---|---|---|---|---|---|---|---|
| | Liquid Reaction Medium | Catalyst | Reaction Temp., °C. | Reaction Time (Hours) | Percent Yield of Polymer | Percent Bromine | Resistivity,[2] ohm.–cm. |
| 1 | Toluene | TiCl$_4$ | −70 | 48 | 100 | 42.7 | |
| 2 | do | TiCl$_4$ / TiBAL[1] | −70 | 48 | 17 | 41.2 | |
| 3 | do | TiCl$_4$ | 0 | 17 | 70 | 41.2 | |
| 4 | do | TiCl$_4$ / TiBAL | 0 | 17 | 94 | 39.8 | 1.7×10$^6$ |
| 5 | do | TiCl$_4$ | 50 | 17 | 54 | 36.2 | 1.2×10$^6$ |
| 6 | do | TiCl$_4$ / TiBAL | 50 | 17 | 82 | 34.6 | |
| 7 | Benzene | TiCl$_4$ | 50 | 17 | 53 | 38.3 | 10$^7$ |
| 8 | do | TiBAL / TiCl$_4$ | 50 | 17 | 90 | 34.7 | |
| 9 | Cyclohexane | TiBAL / TiCl$_4$ | 50 | 17 | 64 | 36.1 | |
| 10 | CHCl$_3$ | SnCl$_4$ | 0 | 15 minutes | 96 | 37.4 | |

[1] Triisobutylaluminum.
[2] Resistance measured with a 1000-cycle General Radio Impedance Bridge on molded cylinders of the bromine-containing polymer clamped between two platinum electrodes.

As is apparent from the data in the foregoing tabulation, and, irrespective of the method used for preparation of the polycyclopentadiene, the brominated products prepared in accordance with this invention possessed similar concentrations of bromine, i.e., from about 35 to about 43% or about one atom of bromine per two units of cyclopentadiene in the polymer.

EXAMPLE 2

Polymerization of cyclopentadiene

Same as described in Example 1 using 200 ml. of toluene as the liquid reaction medium, 2.24 ml. of the triisobutylaluminum solution, 2.2 ml. of the TiCl$_4$ solution, and 10 ml. of cyclopentadiene with a reaction time of 17 hours at 0° C. Polymer yield=8.0 grams.

Chlorination of polymer

Same procedure as described in Example 1 (for bromination) but with use of the following:

6 grams of polymer of Example 2 dissolved in 150 ml. of CCl$_4$; 8 grams of chlorine gas; 16.15 ml. of pyridine. Polymer yield=5.6 grams containing 14.9% chlorine (determined by sodium-ammonia reduction and AgNO$_3$ titration). Resistivity of chlorinated polymer= 10$^7$ ohm-cm.

In further runs, solid polycyclopentadiene was treated with bromine under the same conditions, except that in one case one mole of pyridine was used per mole of bromine and, in another case, two moles of pyridine per mole of bromine. The percent bromine in the brominated polymer was 39.8 and 38.2%, respectively. In still other runs, carried out under otherwise similar conditions, equivalent amounts of pyridine and tri-n-propylamine were used and the brominated polymers produced contained 35.9 and 38.8%, respectively. Such data indicates that neither increasing the amount nor strength of the base contributed to further substantial removal of bromine as hydrogen bromide. In further studies carried out with the polymerized cyclopentadienes, bromination of the polymer was carried out in an open vessel. After a short period of heating (about 30 minutes) with stirring, a black precipitate formed that had a bromine content of 67.7%, a value close to the theoretical maximum bromine content of 70.8% for a completely saturated polymer, showing that for such a short reaction period the polymer took up its theoretical content of bromine, i.e., about four atoms of bromine for two units of cyclopentadiene in the polymer. Still further studies were then carried out by exclusion of air and water from the reaction vessel during the bromination-dehydrobromination reaction. This was accomplished by prior treatment of reactants with dry nitrogen and supply of a continuous stream of dry nitrogen to the reaction vessel. By treatment of the solid polycyclopentadiene, dissolved in $CCl_4$, with a stoichiometric amount at reflux conditions of bromine for about twenty hours, and in certain runs with addition of a base after one-half hour following the start of the bromination treatment, bromine-containing cyclopentadiene polymers were obtained containing from about 35.9 to about 39.8% bromine.

In the runs carried out without use of a base (e.g., pyridine), bromine was added to a carbon tetrachloride solution of solid polycyclopentadiene and heated at reflux for 20 hours while a stream of nitrogen was swept through the solution, then through an ice trap to remove free bromine, and then through a standard NaOH trap to remove HBr. No bromine appeared in either trap nor was any left in the reaction vessel. Thus, all of the bromine was involved in the reaction. The amount of HBr was determined and the bromine content of the polymer was calculated to be 35.6%. A small amount of the bromine-containing polymer (dry powder) was pyrolyzed in nitrogen at 235° C. and the gas stream was caught in a standard NaOH trap. Liberation of a small amount of HBr occured to the extent that the remaining bromine content of the polymer decreased to 32%. Hence, such studies show that the initially produced brominated polymer contained bromine atoms that are easily removed and others that are very resistant to further reaction, and that the resistant bromine atoms approximate the theoretical amount of bromine for one atom of bromine for two units of cyclopentadiene in the polymer.

Analysis of the polymers (before bromination) set forth in the tabulation of Example 1 was made by infrared. The spectra obtained showed a striking similarity in the structure of the polycyclopentadienes irrespective of the different process by which they were prepared. The infra-red spectra, obtained by KBr pelleting of the various polycyclopentadienes and of the bromodehydropolycyclopentadienes (about 38% bromine), showed the following:

| | Polymer, $cm^{-1}$ | Bromine-containing Polymer, $cm^{-1}$ |
|---|---|---|
| Absorption maximum corresponding to cis=C—H stretching | 3,077 | 3,049 |
| C=C stretching | 1,621 | 1,623 |
| $CH_2$ stretching | 2,933 and 2,860 | 2,933 and 2,857 |

Such data illustrate the presence of double bonds in the polymer prior to bromination and following bromination-dehydrobromination.

In further reference to the structure of the novel halogenated polymers embodied herein, it appears that it is mainly of conjugated unsaturation as, for substances of the polyene type, it is believed to be generally accepted that the dark color (as possessed by the products embodied herein) are due to a substantial and continuous system of conjugated unsaturation. Such a general acceptance is based in published studies indicating that the wave length of absorbed light increases directly with the length of conjugated sequence. As described hereinbefore, and using bromination of polycyclopentadienes for illustration, the progressive change of color during dehydrobromination in the process of this invention from yellow to yellow-green to green to a final blue-black represents a progressive increase in the wave length of absorption, i.e., a progressive increase in the length of conjugated sequences of the bromodehydropolycyclopentadiene. The halogenated polymers embodied herein are products that, as produced, are finely divided and resemble carbon in nature, have unusually low conductance, are readily pressure moldable without need of heat and are very refractory. In illustration, polymers produced in accordance with this invention and which, for example, contain about 38% bromine are dark-colored, have an unusually low conductance (e.g., resistivity of $1.2 \times 10^6$ ohm-cm.), are readily moldable without application of heat and do not pyrolyze completely in a nitrogen atmosphere until exposed to over about 1100° C. Another desirable property of such a polymer is that it has an electron spin density of about $10^{18}$ spins per gram. Thus, such materials are particularly useful as semiconductors and refractories.

What is claimed is:

1. A solid halogenated dehydropolycyclopentadiene consisting substantially of a linear series of five-membered rings and containing from about one to about three atoms of a halogen per six five-membered rings in said polymer.

2. A solid halogenated dehydropolycyclopentadiene, as defined in claim 1, containing about one atom of a halogen per two five-membered rings in said polymer.

3. A solid halogenated dehydropolycyclopentadiene, as defined in claim 1, in which the halogen is from the group consisting of bromine and chlorine.

4. A solid bromine-containing dehydropolycyclopentadiene consisting substantially of a linear series of five-membered rings, characterized by being resistant to complete pyrolysis in a nitrogen atmosphere at temperatures up to about 1100° C., and containing from about one to about three atoms of bromine per six five-membered rings.

5. A solid polymer, as defined in claim 4, which contains about one atom of bromine per two five-membered rings in said polymer.

6. A method for preparation of a solid halogenated dehydropolycyclopentadiene which comprises contacting a solution of a solid polymer of cyclopentadiene with a halogen to initially produce a halogenated polycyclopentadiene containing substantially more than one atom of halogen per two five-membered rings in the polymer and heating said halogenated polycyclopentadiene at from about 40 to about 100° C. for at least about one half hour to dehalogenate said halogenated polycyclopentadiene to a solid polymer containing from about one to about three atoms of halogen per six five-membered rings in said polymer.

7. A method for preparation of a solid halogenated dehydropolycyclopentadiene which comprises contacting with a halogen a solution of a normally solid cyclopentadiene to initially produce a halogenated polycyclopentadiene containing more than one atom of halogen per two five-membered rings in the polymer and heating said halogenated polycyclopentadiene at a temperature within the ringe of above 20° C. to about 250° C. for at least about one half hour to dehalogenate said halogenated polycyclopentadiene to a solid polymer containing from about one to about three atoms of halogen per six five-membered rings in said polymer.

8. A method, as defined in claim 7, wherein the solid polymer of cyclopentadiene is a substantially linear polymer having a molecular weight of at least about 1500.

9. A method, as defined in claim 7, wherein the halogen is bromine.

10. A method, as defined in claim 6, wherein the solution of the solid polymer of cyclopentadiene is contacted with a halogen in an amount stoichiometrically sufficient to saturate the polymer.

11. A method, as defined in claim 6, wherein the contact of the solution of the polymer and the halogen is carried out under an inert atmosphere.

12. A method, as defined in claim 6, wherein the solution of the polycyclopentadiene is contacted with the halogen and maintained at a reflux temperature for a period of time sufficient to dehydrohalogenate the polymer.

13. A method, as defined in claim 6, wherein the polycyclopentadiene is dissolved in a member from the group consisting of hydrocarbons and halogenated hydrocarbons that are solvents for said polycyclopentadiene.

14. A method, as defined in claim 13, wherein the solvent is $CCl_4$.

15. A method, as defined in claim 6, wherein the halogen is bromine.

16. A method, as defined in claim 6, wherein the halogen is chlorine.

17. A method, as defined in claim 6, wherein the solid polymer of cyclopentadiene is dissolved in $CCl_4$, the contact of the halogen with the polymer solution is carried out under reflux conditions, and the halogen is from the group consisting of bromine and chlorine.

18. A method, as defined in claim 17, wherein the initially halogenated polymer is dehalogenated to a polymer containing about one atom of halogen per two five-membered rings in the polymer.

References Cited by the Examiner
UNITED STATES PATENTS

| | | | |
|---|---|---|---|
| 2,261,757 | 11/1941 | Fawcett | 260—94.9 |
| 2,513,330 | 7/1950 | Kaganoff | 260—93.1 |
| 2,581,927 | 1/1952 | Briant | 260—94.7 |

JOSEPH L. SCHOFER, *Primary Examiner.*